(12) United States Patent
Gonzalez-Banos et al.

(10) Patent No.: US 7,355,364 B2
(45) Date of Patent: Apr. 8, 2008

(54) MOTOR AND CONTROLLER INVERSION: COMMANDING TORQUE TO POSITION-CONTROLLED ROBOTS

(75) Inventors: Hector H. Gonzalez-Banos, Mountain View, CA (US); Behzad Dariush, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 11/541,001

(22) Filed: Sep. 29, 2006

(65) Prior Publication Data

US 2007/0070738 A1    Mar. 29, 2007

Related U.S. Application Data

(60) Provisional application No. 60/722,339, filed on Sep. 29, 2005.

(51) Int. Cl.
  *G05B 5/01*    (2006.01)
  *G05B 11/36*   (2006.01)
(52) U.S. Cl. ............... 318/568.22; 318/610; 318/611; 318/632
(58) Field of Classification Search ............ 318/560, 318/561, 563, 568.22, 568.24, 609–611, 621, 318/623, 629, 632
See application file for complete search history.

(56) References Cited

U.S. PATENT DOCUMENTS 4,078,256 A * 3/1978 Seidel .................... 708/845
4,980,620 A * 12/1990 Losic et al. ............. 318/268
4,985,925 A * 1/1991 Langberg et al. ........ 381/71.6
4,989,161 A * 1/1991 Oaki ....................... 700/261
5,001,770 A * 3/1991 Losic et al. .............. 388/811
5,019,958 A * 5/1991 Varga et al. ............. 363/97
5,440,642 A * 8/1995 Denenberg et al. ...... 381/71.13
5,623,189 A * 4/1997 Hemmer .................. 318/432
5,648,709 A   7/1997 Maeda
6,920,362 B2 * 7/2005 Matsumoto .............. 700/45

OTHER PUBLICATIONS

An, C., et al., "Chapter 1: Introduction" in Model-Based Control of a Robot Manipulator, 1988, pp. 1-30, The MIT Press, Cambridge, MA.

(Continued)

*Primary Examiner*—Bentsu Ro
(74) *Attorney, Agent, or Firm*—Fenwick & West LLP; Mark E. Duell

(57) ABSTRACT

Systems and methods are presented that cancel the dynamics of a motor and a joint controller in the presence of communication time delays, measurement noise, and controller parameter uncertainties inherent in a robot system. A cancellation system includes feedback of the measured output $\hat{E}$ of a controller block C. A first summing node ($\Sigma_1$) subtracts $\hat{E}$ from the desired voltage $E_d$ to determine a voltage error, which is fed into a G(s) block. A second summing node ($\Sigma_2$) adds the output of the G(s) block to the desired voltage $E_d$ to generate the signal E, which is fed into a non-robust controller inversion block $C^{-1}$. The block $C^{-1}$ outputs a value μ, which is fed into the block C. The block C outputs the actual voltage E, which is input into a motor block M. Under perfect conditions, the voltage error is zero, in which case the input to block G(s) is zero.

20 Claims, 9 Drawing Sheets

OTHER PUBLICATIONS

Khatib, O., "A Unified Approach for Motion and Force Control of Robot Manipulators: The Operational Space Formulation," IEEE Journal of Robotics and Automation, Feb. 1987, vol. RA-3, No. 1, pp. 43-53.

Takegaki, M., et al., "A New Feedback Method for Dynamic Control of Manipulators," ASME Journal of Dynamic Systems, Measurement, and Control, Jun. 1981, vol. 102, pp. 119-125.

Muir, P., "Linearizing the Joint Torque Characteristics of an Electric Direct-Drive Robot for High Performance Control of in-Contact Operations," Proceedings of the 1992 IEEE International Conference on Robotics and Automation, May 1992, pp. 1866-1874, Nice, France.

Roy, J., "Adaptive Force Control of Position/Velocity Controlled Robots: Theory and Experiment," IEEE Transactions on Robotics and Automation, Apr. 2002, pp. 121-137, vol. 18, No. 2.

Volpe, R., "A Theoretical and Experimental Investigation of Explicit Force Control Strategies for Manipulators," IEEE Transactions on Automatic Control, Nov. 1993, pp. 1634-1650, vol. 38, No. 11.

Volpe, R., "Real and Artificial Forces in the Control of Manipulators: Theory and Experiments," Department of Physics, The Robotics Institute, Sep. 21, 1990, pp. 1-139, Pittsburgh, PA.

* cited by examiner

MOTOR AND CONTROLLER INVERSION: COMMANDING TORQUE TO POSITION-CONTROLLED ROBOTS

CROSS-REFERENCE TO RELATED APPLICATION

This application claims priority from the following U.S. provisional patent application, which is hereby incorporated by reference: Ser. No. 60/722,339, filed on Sep. 29, 2005, entitled "Motor and Controller Inversion: Commanding Torque to Position Controlled Robots."

BACKGROUND OF THE INVENTION

1. Field of the Invention

The present invention relates to a control scheme that cancels the dynamics of a motor and a joint controller. More particularly, the present invention relates to a control scheme that cancels the dynamics of a motor and a joint controller provided by a robot manufacturer.

2. Description of Background Art

Robot manufacturers frequently equip robots with built-in control schemes. These schemes typically use a combination of joint position, joint velocity, and derivative action to independently control each joint. Common control schemes include proportional plus integral (PI), proportional plus derivative (PD), and proportional plus integral plus derivative (PID).

The actuator most commonly used in robot joints is a permanent magnet direct current (DC) motor. A DC motor is driven by a controllable voltage or current source. Some manufacturers enable a user to indirectly command a desired torque by applying a signal that is proportional to the motor's armature current. Since a motor's torque is proportional to its armature current, the torque can be directly and accurately controlled.

However, commanding current (and therefore torque) is not always an option, particularly if a robot is not intended to be used to develop novel control schemes. In this situation, the built-in motor and controller appear as a black box to the user. This forces the user to apply position or velocity commands and then entrust the robot's own built-in independent-joint controller to execute those commands.

One disadvantage of the independent-joint control schemes supplied by robot manufacturers is that each joint controller acts independently of the dynamics at neighboring joints and produces perturbations at these joints. Also, the feedback gains are constants and pre-specified. The controllers cannot update the feedback gains under varying payloads. This is problematic because robots are highly non-linear systems. Their inertial effects, couplings between joints, and gravity effects are all either position-dependent or position-and-velocity-dependent terms. Furthermore, the inertial loading terms can change drastically at high speeds. Thus, independent-joint control schemes that use constant feedback gains to control a robot do not perform well under varying speeds and payloads.

In recent years, the robotics and control communities have developed sophisticated control schemes that involve commanding a torque to a robot (i.e., instructing a robot to exhibit a particular torque at a particular joint actuator). Unfortunately, many researchers and practitioners cannot test or validate such control algorithms using robots that do not accept torque commands.

SUMMARY OF THE INVENTION

Systems and methods are presented that cancel the dynamics of a motor and a joint controller. In one embodiment, a motor-controller inversion (MCI) block attempts to invert (cancel) the dynamics of a robot's built-in controller and motor. Specifically, a commanded torque $\tau_c$ is input to the MCI block. The output of the MCI block is fed into a controller block C. The output of the controller block C is fed into a motor block M. The motor block M outputs the actual torque $\tau$.

In one embodiment, the MCI block is an open-loop inverter that includes a motor inversion block $M^{-1}$ followed by a controller inversion block $C^{-1}$. To cancel the effect of the built-in controller (block C), the controller inversion block $C^{-1}$ with input $\bar{E}$ and output $q_d$ should be designed to produce a unity gain transfer function between $\bar{E}$ (which is input to block $C^{-1}$) and E (which is output by block C). To cancel the effect of the built-in motor (block M), the motor inversion block $M^{-1}$ with input $\tau_c$ and output $\bar{E}$ should be designed to produce a unity gain transfer function between $\tau$ and $\tau_c$ (when cascaded with the controller inversion block $C^{-1}$, the controller block C, and the motor block M).

In reality, this MCI block would not perfectly cancel the dynamics of a robot's built-in motor and controller due to communication time delays (both feed-forward and feedback), noise in measurements, and controller parameter uncertainties inherent in the system. Instead, a more robust system is used. In one embodiment, this system includes feedback of the measured output $\hat{E}$ of block C and thus is closed-loop. A first summing node ($\Sigma_1$) subtracts $\hat{E}$ from the desired voltage $E_d$ to determine a voltage error. This error is fed into a G(s) block, which will be explained below. A second summing node ($\Sigma_2$) adds the output of the G(s) block to the desired voltage $E_d$ to generate the signal $\bar{E}$, which is fed into the original (non-robust) controller inversion block $C^{-1}$. The controller inversion block $C^{-1}$ includes an $H_c^{-1}$ block and a third summing node ($\Sigma_3$), which adds the output of the $H_c^{-1}$ block to the measured angular position $\hat{q}$. The controller inversion block $C^{-1}$ outputs a value $\mu$, which is the desired joint angle input of controller C. Variable $\mu$ is renamed from $q_d$ to emphasize that this variable no longer represents the true desired joint angle position, but instead represents an intermediate control signal.

The output of this robust controller inversion system ($\mu$) is fed into the controller block C. The controller block C includes a fourth summing node ($\Sigma_4$), which subtracts the actual angular position q from the output of the controller inversion block $C^{-1}$ ($\mu$), and an $H_c^{-1}$ block that takes as input the output of the fourth summing node ($\Sigma_4$). The controller block C outputs the actual voltage E.

In one embodiment, the G(s) block includes four integrators (integ$_n$), four amplifiers (amp$_n$), and three summing nodes ($\Sigma_n$). The input to the G(s) block ($E_d - \hat{E}$) is fed into a first integrator (integ$_1$). The output of the first integrator (integ$_1$) is fed into a first summing node ($\Sigma_1$) and a second integrator (integ$_2$). The output of the second integrator (integ$_2$) is fed into a first amplifier (amp$_1$) and a third integrator (integ$_3$). The output of the third integrator (integ$_3$) is fed into a second amplifier (amp$_2$) and a fourth integrator (integ$_4$). The output of the fourth integrator (integ$_4$) is fed into a third amplifier (amp$_3$). The third summing node ($\Sigma_3$) outputs the sum of the output of the third amplifier (amp$_3$) and the output of the second amplifier (amp$_2$). The second summing node ($\Sigma_2$) outputs the sum of the output of the third summing node ($\Sigma_3$) and the output of the first amplifier (amp$_1$). The first summing node ($\Sigma_1$) outputs the sum of the output of the second summing node ($\Sigma_2$) and the output of the first integrator (integ$_1$). The output of the first summing node ($\Sigma_1$) is fed into a fourth amplifier (amp$_c$), where c represents "controller"). The output of the fourth amplifier (amp$_c$) is used as the output of the G(s) block ($\hat{E}-E_d$).

The purpose of block G(s) is to achieve robustness in the presence of communication delays and/or imperfect cancellation of block C. Under perfect conditions, the measurement $\hat{E}$ equals the desired voltage $E_d$, in which case the input to block G(s) is zero. Thus, the robust controller inversion approaches the performance of open-loop perfect cancellation as model accuracy increases and communication delays decrease. However, when conditions are not perfect, the input to G(s) is not zero, and the block compensates accordingly.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
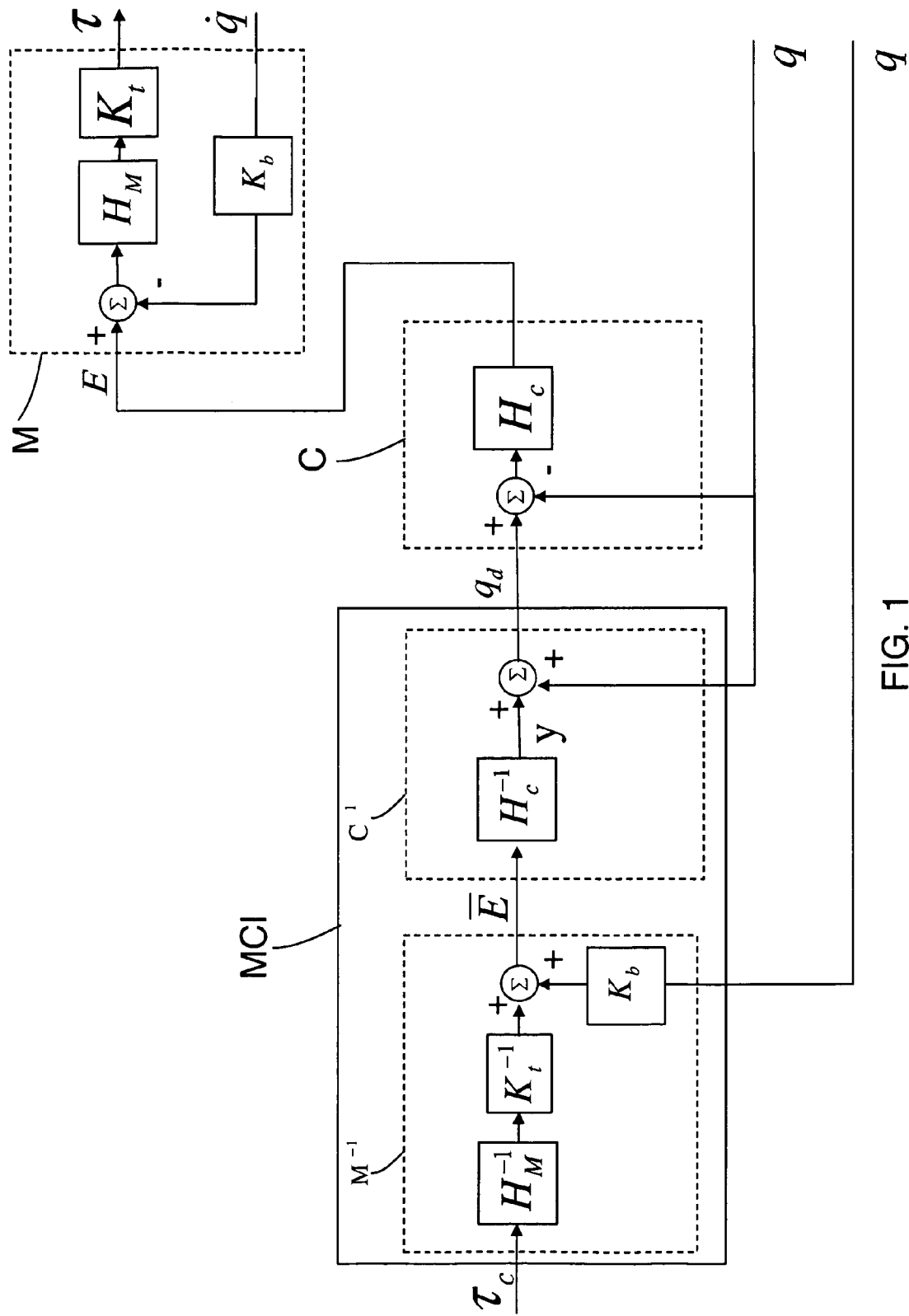
FIG. 1 illustrates a diagram of a system using open-loop motor and controller inversion, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Overview of Canceling the Dynamics of a Motor and a Joint Controller

Many robots have built-in motors and independent-joint controllers. In addition, many robots accept only position or velocity commands to control their joints. With robots like these, in order to control a joint based on torque, it is helpful to invert (cancel) the dynamics of the robot's built-in motor and independent-joint controller. FIG. 1 illustrates a diagram of a system using open-loop motor and controller inversion, according to one embodiment of the invention. The illustrated system includes a motor-controller inversion (MCI) block, a controller block C, and a motor block M.

The controller block C represents an independent-joint controller built-in to a robot by a manufacturer. The inputs to the controller block C are a desired joint angle ($q_d$) and an actual joint angle (q). The output is a voltage (E), which is fed to the motor (specifically, to the motor's armature). The controller block C exhibits a transfer function of $H_c$. The Σ node represents a summing operation.

The motor block M represents a motor built-in to a robot by a manufacturer. The inputs to motor block M are the voltage (E) and an actual joint angular velocity ($\dot{q}$). The output is a torque τ. The motor block M exhibits a transfer function of $H_M$. $K_t$ and $K_b$ represent the motor-torque proportional constant and the armature back electromotive force (emf) constant, respectively. The Appendix further explains the dynamics of a robot's built-in controller and motor, including several variables.

The MCI block attempts to invert (cancel) the dynamics of the robot's built-in controller and motor, represented by the C block and the M block, respectively. An ideal MCI block would perfectly cancel the dynamics, such that the transfer function between the commanded torque $\tau_c$ (which is input to the MCI block) and the actual torque τ (which is output by the M block) is unity.

The system shown in FIG. 1 assumes that the MCI block is ideal, i.e., that the MCI block perfectly cancels the dynamics of the robot's built-in motor (block M) and controller (block C). The idealized MCI block is an open-loop inverter that includes a motor inversion block $M^{-1}$ followed by a controller inversion block $C^{-1}$. To cancel the effect of the built-in controller (block C), the controller inversion block $C^{-1}$ with input $\bar{E}$ and output $q_d$ should be designed to produce a unity gain transfer function between $\bar{E}$ (which is input to block $C^{-1}$) and E (which is output by block C). In other words, the transfer function of the controller inversion block $C^{-1}$ should be the multiplicative inverse of the transfer function of the controller block C. Note that although the feedback of signals q and $\dot{q}$ appears to close a loop, these signals are not used to generate error or correction signals. Instead, they are used to cancel the summation operands in blocks C and M. Thus, the system remains open loop.

To cancel the effect of the built-in motor (block M), the motor inversion block $M^{-1}$ with input $\tau_c$ and output $\bar{E}$ should be designed to produce a unity gain transfer function between τ and $\tau_c$ (when cascaded with the controller inversion block $C^{-1}$, the controller block C, and the motor block M). It follows that cascading the four blocks ($M^{-1}$, $C^{-1}$, C, M) will result in a system with the following transfer characteristics:

$$\frac{\tau}{\tau_c} = \frac{E}{\bar{E}} = 1. \tag{1}$$

To design the controller inversion block $C^{-1}$, use the following control inversion equation in Laplace representation:

$$Q_d(s) = H_c^{-1}(s)\bar{E}(s) + Q(s). \tag{2}$$

In one embodiment, where $H_c$ represents a PID controller, $H_c^{-1}$ (s) is given by:

$$H_c^{-1}(s) = \frac{K_v^{-1}s}{s^2 + K_p K_v^{-1}s + K_I K_v^{-1}}. \tag{3}$$

To perform controller inversion for all the joint controllers in a robot with n actuated joints, use the following multi-input, multi-output (MIMO) extension to Eq. 2:

$$q_d = y + q, \tag{4}$$

where $q_d$, y, and q correspond to n-dimensional vectors. The solution to Eq. 4 is obtained by solving the following equations for the output y:

$$\dot{x} = \begin{bmatrix} \varnothing & \bar{I} \\ -K_I K_v^{-1} & -K_p K_v^{-1} \end{bmatrix} x + \begin{bmatrix} \varnothing \\ \bar{I} \end{bmatrix} \bar{E}, \tag{5}$$

$$y = \lfloor \varnothing \quad K^- \rfloor x, \tag{6}$$

where $K_p$ represents a diagonal n×n position matrix, $K_v$ represents a diagonal n×n velocity matrix, $K_I$ represents a diagonal n×n integral gain matrix, $\varnothing$ represents an n×n zero matrix, and $\bar{I}$ represents an n×n identity matrix.

To design the motor inversion block $M^{-1}$, use the following motor inversion equation, which takes $\tau_c$ as input and outputs $\bar{E}$:

$$\bar{E}(s) = H_M^{-1}(s)K_t^{-1}\tau_c(s) + sK_b Q(s). \tag{7}$$

In one embodiment, where $H_M$ represents an armature-controlled DC motor (see the Appendix), $H_M^{-1}$ (s) is given by:

$$H_M^{-1}(s) = sL_a + R_a. \tag{8}$$

Figure 2:
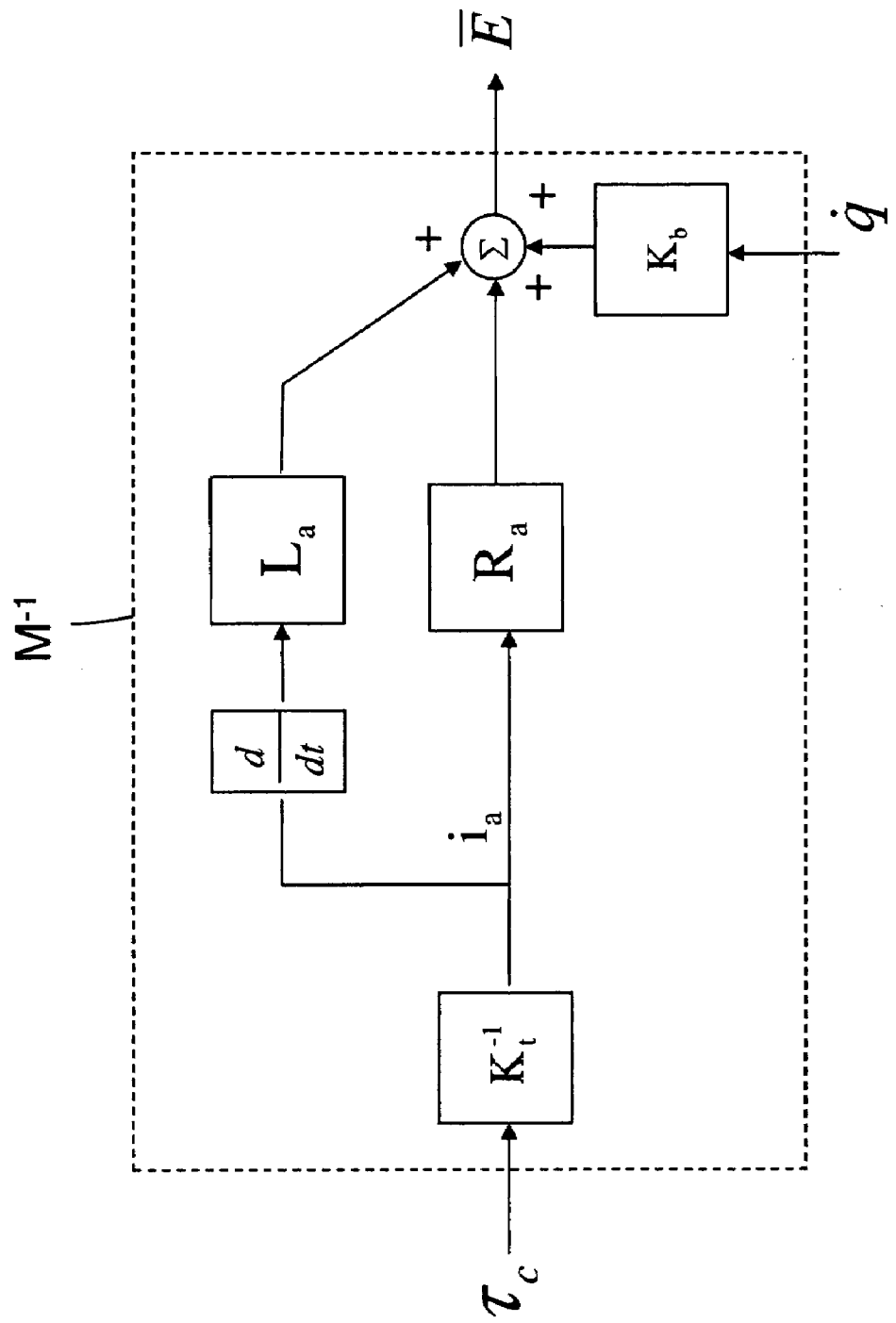
FIG. 2 illustrates a diagram of an inverse motor block for a multi-input multi-output system, according to one embodiment of the invention.

To perform motor inversion for all the motors in a robot with n actuated joints, use the following multi-input, multi-output (MIMO) extension to Eq. 8:

$$\bar{E} = L_a \frac{di_a}{dt} + i_a R_a + K_b \dot{q}, \tag{9}$$

$$i_a = K_t^- \tau, \tag{10}$$

where the boldface quantities denoted by upper case letters correspond to n×n diagonal matrices, and the boldface quantities denoted by lower case letters correspond to n×1 vectors. FIG. 2 illustrates a diagram of an inverse motor block for a multi-input multi-output system, according to one embodiment of the invention. Specifically, FIG. 2 shows how to design a multi-input multi-output inverse motor block using the values in Eqs. 9 and 10.

2. Robust Cancellation

The system shown in FIG. 1 includes an idealized MCI block that perfectly cancels the dynamics of the robot's built-in motor (block M) and controller (block C). In reality, the illustrated MCI block would not perfectly cancel the dynamics of the robot's built-in motor and controller due to communication time delays (both feed-forward and feedback), noise in measurements, and controller parameter uncertainties inherent in the system.

Figure 3:
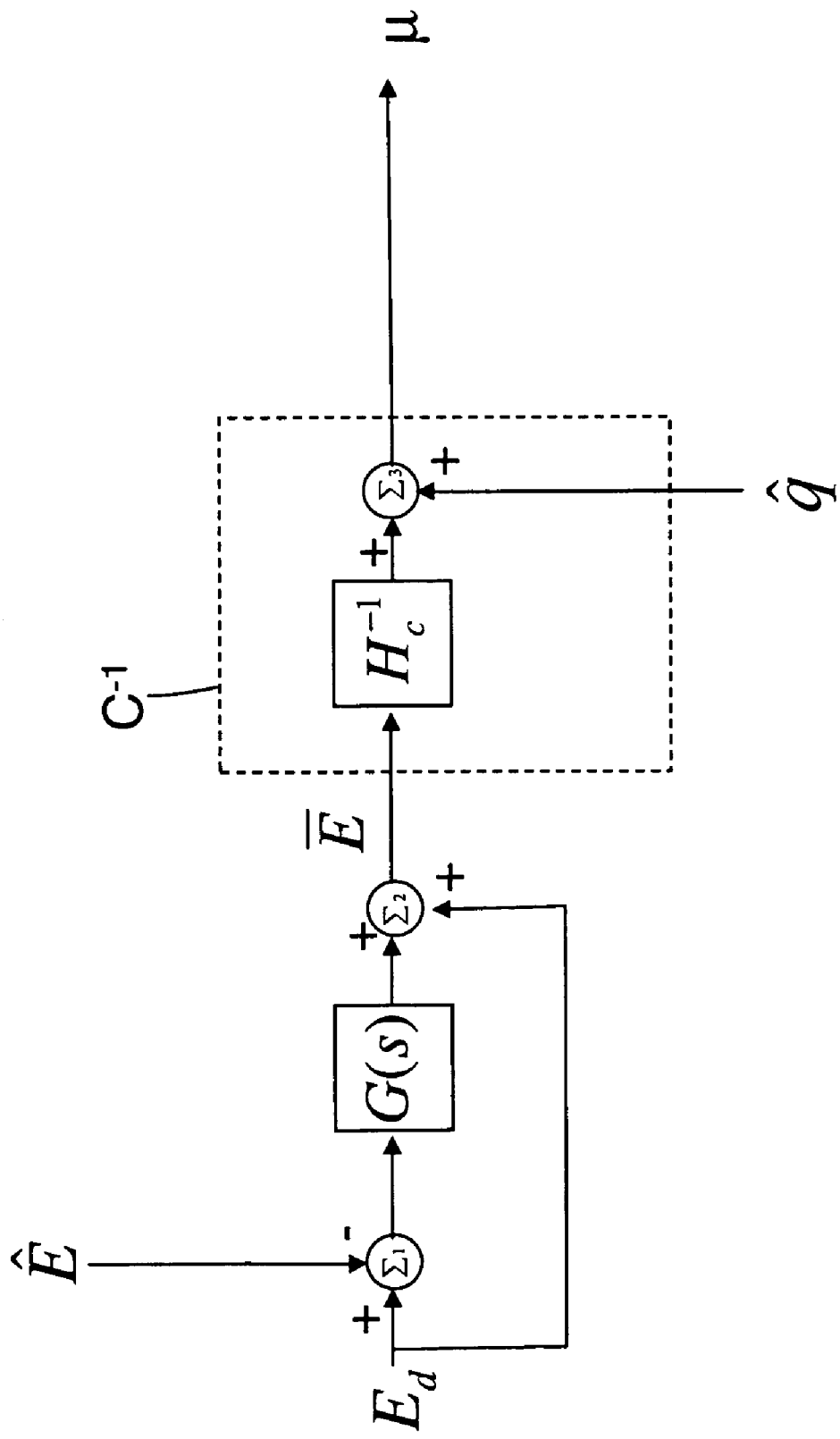
FIG. 3 illustrates a diagram of a system for robust controller inversion, according to one embodiment of the invention.

In real systems, a more robust MCI block should be used. FIG. 3 illustrates a diagram of a system for robust controller inversion, according to one embodiment of the invention. The illustrated system is closed-loop, i.e., it includes feedback of the measured output $\hat{E}$ of block C. The first summing node ($\Sigma_1$) subtracts $\hat{E}$ from the desired voltage $E_d$ to determine a voltage error. This error is fed into the G(s) block, which is used for error correction and will be explained below. The second summing node ($\Sigma_2$) adds the output of the G(s) block (an error correction value) to the desired voltage $E_d$ to generate the signal $\bar{E}$, which is fed into the original (non-robust) controller inversion block $C^{-1}$. The controller inversion block $C^{-1}$, which was described above with reference to FIG. 1, includes an $H_c^{-1}$ block and a third summing node ($\Sigma_3$), which adds the output of the $H_c^{-1}$ block to the measured angular position $\hat{q}$. The controller inversion block $C^{-1}$ outputs a value $\mu$, which is the desired joint angle input of controller C. Variable $\mu$ is renamed from $q_d$ to emphasize that this variable no longer represents the true desired joint angle position, but instead represents an intermediate control signal.

Figure 4:
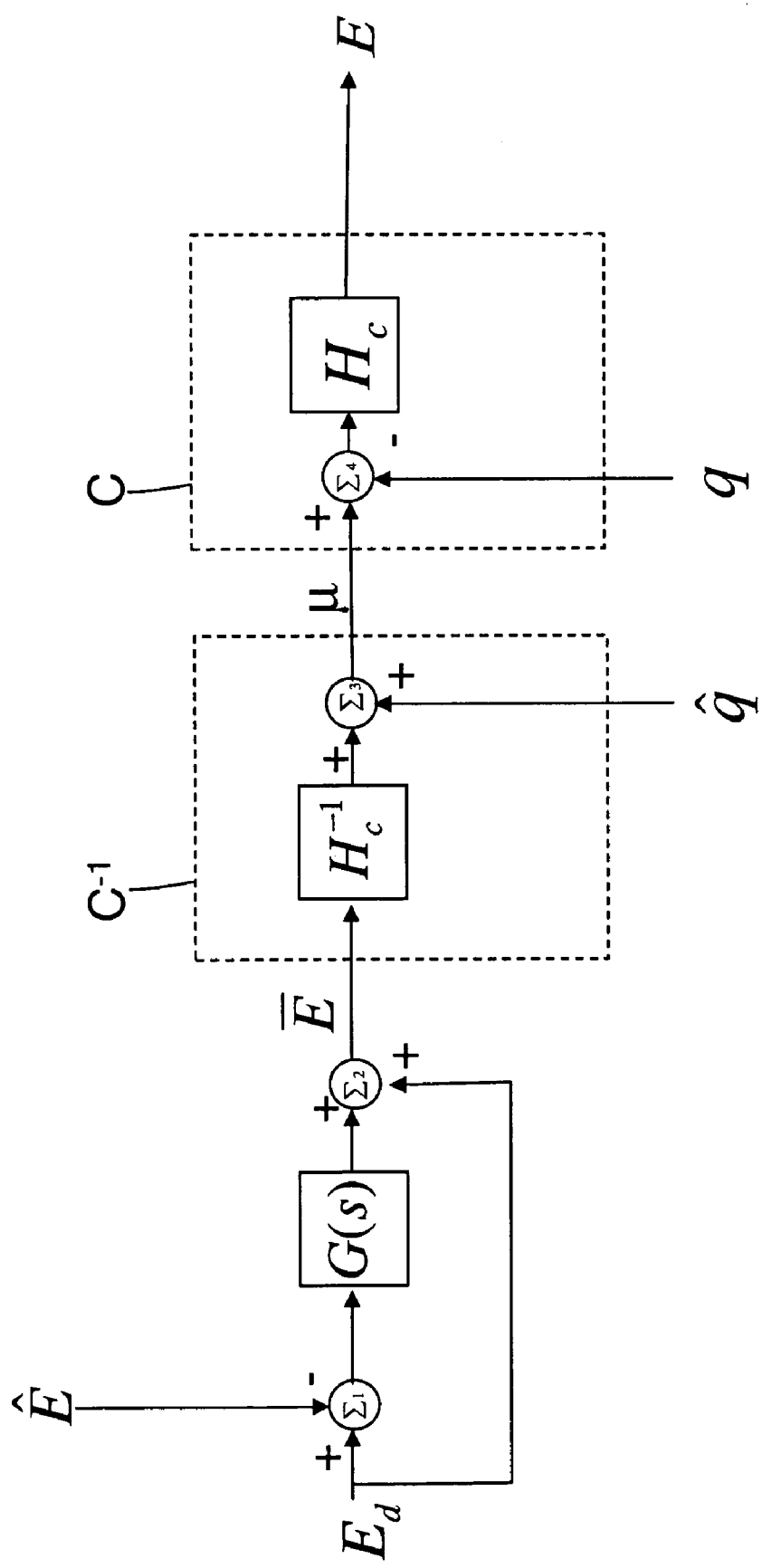
FIG. 4 illustrates a diagram of a system for robust controller inversion and a controller block, according to one embodiment of the invention.

FIG. 4 illustrates a diagram of a system for robust controller inversion and a controller block, according to one embodiment of the invention. Specifically, FIG. 4 shows the robust controller inversion system of FIG. 3 followed by the controller block C. The output of the robust controller inversion system ($\mu$) is fed into the controller block C. The controller block C, which was described above with reference to FIG. 1, includes a fourth summing node ($\Sigma_4$), which subtracts the actual angular position q from the output of the controller inversion block $C^{-1}$ ($\mu$), and an $H_c^{-1}$ block that takes as input the output of the fourth summing node ($\Sigma_4$). The controller block C outputs the actual voltage E.

Note that $\hat{q}$ and $\hat{E}$ represent measured quantities, whereas q and E represent the true (actual) values. If there is no time delay in obtaining measurements, then measured quantities are generally equal to actual quantities. However, if there is a time delay in obtaining measurements, then measured quantities and actual quantities may differ. This is because the measured quantities are "stale" and may no longer reflect the actual quantities (e.g., if the actual quantities have changed since the measurements were taken).

Figure 5:
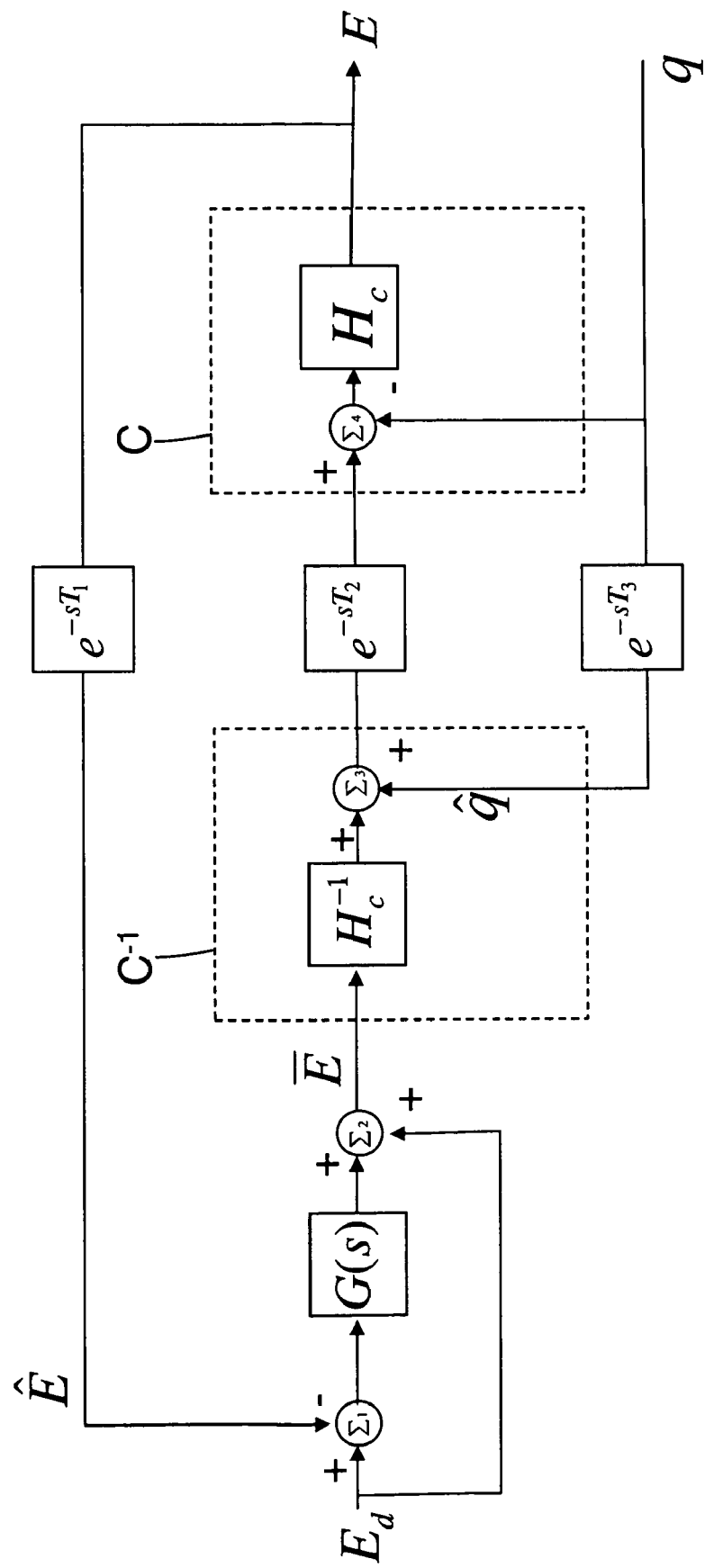
FIG. 5 illustrates a diagram of a system for robust controller inversion and a controller block in the presence of feed-forward and feedback signal time delays, according to one embodiment of the invention.

FIG. 5 illustrates a diagram of a system for robust controller inversion and a controller block in the presence of feed-forward and feedback signal time delays, according to one embodiment of the invention. FIG. 5 is similar to FIG. 4 except that there are time delays in various feed-forward and feedback signals. These time delays are shown in Laplace form as $e^{-sT}$, where T represents the amount of delay. Specifically, the feedback signal of measured voltage $\hat{E}$ is delayed by time $T_1$, the feed-forward signal output from the original (non-robust) controller inversion block $C^{-1}$ ($\mu$) is delayed by time $T_2$, and the feedback signal of measured angular velocity $\hat{q}$ is delayed by time $T_3$. In one embodiment, $T_1$ and $T_3$ are assumed to be equal.

Figure 6:
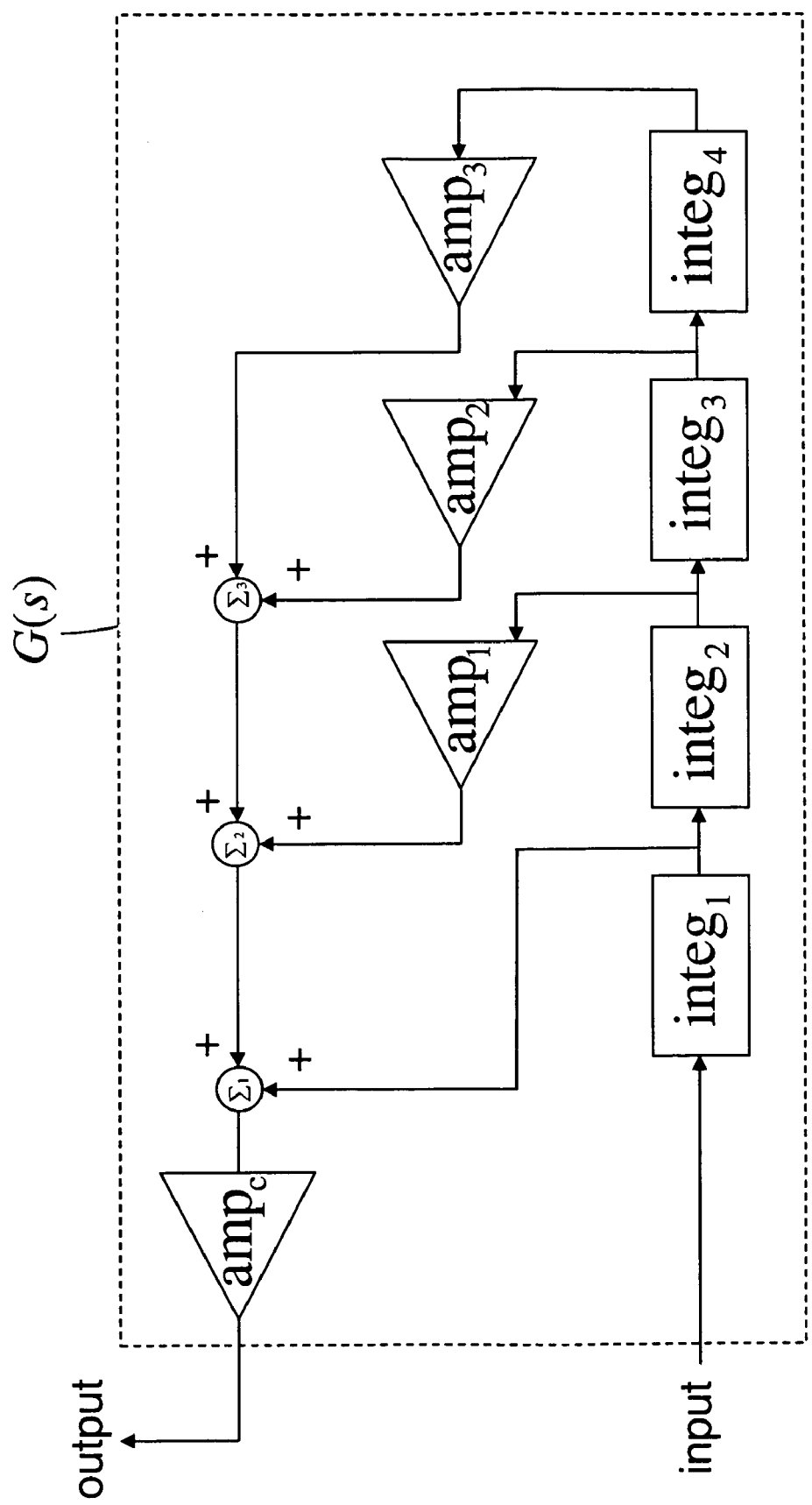
FIG. 6 illustrates a diagram of a system for the G(s) block in FIGS. 3, 4, and 5, according to one embodiment of the invention.

FIG. 6 illustrates a diagram of a system for the G(s) block in FIGS. 3, 4, and 5, according to one embodiment of the invention. The illustrated system includes four integrators (integ$_n$), four amplifiers (amp$_n$), and three summing nodes ($\Sigma_n$). In Laplace form, an integrator (or "time integral block") is usually shown as 1/s. An amplifier is usually shown as K*u, where u is the input to the amplifier, and K is the gain of the amplifier.

The input to the G(s) block ($E_d - \hat{E}$, a voltage error) is fed into a first integrator (integ$_1$). The output of the first integrator (integ$_1$) is fed into a first summing node ($\Sigma_1$) and a second integrator (integ$_2$). The output of the second integrator (integ$_2$) is fed into a first amplifier (amp$_1$) and a third integrator (integ$_3$). The output of the third integrator (integ$_3$) is fed into a second amplifier (amp$_2$) and a fourth integrator (integ$_4$). The output of the fourth integrator (integ$_4$) is fed into a third amplifier (amp$_3$). The third summing node ($\Sigma_3$) outputs the sum of the output of the third amplifier (amp$_3$) and the output of the second amplifier (amp$_2$). The second summing node ($\Sigma_2$) outputs the sum of the output of the third summing node ($\Sigma_3$) and the output of the first amplifier (amp$_1$). The first summing node ($\Sigma_1$) outputs the sum of the output of the second summing node ($\Sigma_2$) and the output of the first integrator (integ$_1$). The output of the first summing node ($\Sigma_1$) is fed into a fourth amplifier (amp$_c$, where c represents "controller"). The output of the fourth amplifier (amp$_c$) is used as the output of the G(s) block ($\bar{E} - E_d$, an error correction value).

The purpose of block G(s) is to achieve robustness in the presence of communication delays and/or imperfect cancellation of block C. Under perfect conditions, the measurement $\hat{E}$ equals the desired voltage $E_d$, in which case the input to block G(s) is zero. Thus, the robust controller inversion approaches the performance of open-loop perfect cancellation as model accuracy increases and communication delays decrease. However, when conditions are not perfect, the input to G(s) is not zero, and the block compensates accordingly.

The system shown in FIG. 6 is only one embodiment of the G(s) block. In other embodiments, the number of integrators (integ$_n$), amplifiers (amp$_n$), and summing nodes ($\Sigma_n$) in the G(s) block varies. In one embodiment, the number of integrators is based on the signal that is fed into the G(s) block and the tolerable amount of steady-state error in the presence of communication delays. For example, in order to cancel a typical PID controller, if the input signal $E_d$ is a step function, two or more integrators are used to drive the steady-state error to zero. If the input signal is a higher-order function (such as a ramp or a parabola), three or more integrators are used to drive the same error to zero.

In one embodiment, the number of amplifiers used is equal to the number of integrators used, and the number of summing nodes used is one fewer than the number of integrators used. In another embodiment, the transfer function of the G(s) block is equal to:

$$\frac{a_n \cdot s^n + a_{n-1} \cdot s^{n-1} + \ldots + a_2 \cdot s^2 + a_1 \cdot s + a_0}{s^{n+1}}.$$

In one embodiment, the value of $a_i$ is not equal to the gain of amplifier i, but there is a direct mapping. Gain$_c$ multiplied by gain$_i$ equals the term $a_{n-i-1}$, and gain$_c$ equals $a_{n-i}$. The term n is the order of G(s). In one embodiment, in transfer function notation G(s) is equal to:

$$\frac{a_{n-1} \cdot s^{n-1} + a_{n-2} \cdot s^{n-2} + \ldots + a_2 \cdot s^2 + a_1 \cdot s + a_0}{s^n},$$

where G(s) is now on the order of n. According to the diagram in FIG. 6, $k_c$ is the gain of amplifier C and $k_i$ is the gain of amplifier i. (In FIG. 6, amplifier 0 is labeled as amplifier c or "amp$_c$.") Then, for a realization of order n, $G(s)=k_c*[1/s+k_1/s^2+k_2/s^3+k_3/s^4+ \ldots +k_{n-1}/s^n]$. Hence, $k_c=a_{n-1}; k_c*k_1=a_{n-2}; k_c*k_2=a_{n-3}; \ldots; k_c*k_{n-2}=a_1; k_c*k_{n-1}=a_0$. In other words, gain$_c$ multiplied by gain$_i$ equals the term $a_{n-i-1}$, and gain$_c$ equals the term $a_{n-1}$. The term n is the order of G(s). The above converts one realization of G(s) into another. The physical or algorithmic implementations of the realizations of G(s) are different.

The cancellation of block M can follow a similar approach as the cancellation of block C if measurements of motor (armature) currents are available for feedback. Alternatively, the cancellation of block M can remain an open-loop cancellation if this feedback is not available. In some situations, the cancellation of block M may not even be necessary.

Typically, permanent magnet DC motors have very predictable dynamics (see the Appendix), thus model cancellation is reasonably accurate. However, communication delays imply that the measured angular velocity $\hat{\dot{q}}$ is not equal to the actual angular velocity $\dot{q}$, and the term $K_b\hat{\dot{q}}$ within block $M^{-1}$ in FIG. 1 will not precisely cancel the term $K_b\dot{q}$ within block M. This can be problematic at high communication delays or high angular velocities, but gear reductions found in typical robots mitigate the problem. In one embodiment, the cancellation was done in open-loop for a Maxon RE-30 brush DC motor with a gear reduction of 200:1 for feedback delays of up to 10 ms.

In other embodiments, block M includes additional electronics used for the correct operation of the motor. For example, brushless DC motors are electronically commutated, whereas a conventional DC motor commutes itself. Thus, fast electronics are used to correctly drive the electrical currents in the motor windings, and these components are additional to those electronics in block C. Brushless motors and their associated electronics attempt to follow a torque input and do so accurately under certain operating conditions. Cancellation of block M under these conditions may not be justified.

3. Outer Loop Control

As explained above, the linear and independent-joint controllers built-in to many. robots create undesirable effects because each joint is controlled independently of its neighboring joints. Many advanced control techniques exist that are designed to control a robot's joints by considering the coupling of the joints' dynamics.

Figure 7:
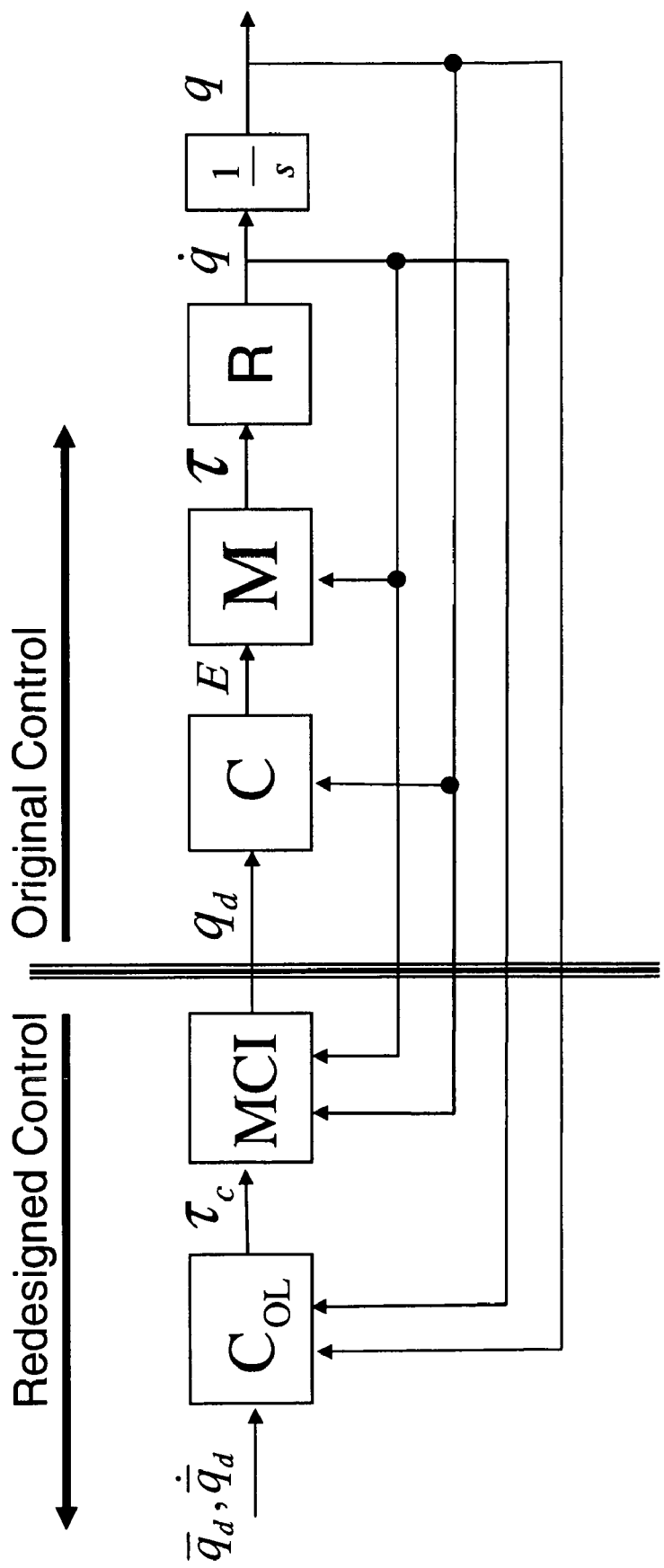
FIG. 7 illustrates a diagram of a system where an outer-loop controller commands torque to a robot that is designed to accept only position commands, according to one embodiment of the invention.

FIG. 7 illustrates a diagram of a system where an outer-loop controller commands torque to a robot that is designed to accept only position commands, according to one embodiment of the invention. Note that FIG. 7 includes a controller block $C_{OL}$ followed by the system of FIG. 1, a plant block R, and a time integral block 1/s. The controller block $C_{OL}$ represents an alternative outer-loop control scheme that controls a robot based on torque, instead of based on position or velocity. Specifically, in one embodiment of an outer loop control scheme, the $C_{OL}$ block takes as input an n×1 vector of desired joint angles ($\bar{q}_d$), an n×1 vector of desired joint velocities ($\bar{\dot{q}}_d$), an n×1 vector of sensed (measured) joint angles ($\hat{q}$), and an n×1 vector of sensed (measured) joint velocities ($\hat{\dot{q}}$), and outputs an n×1 vector of torque commands ($\tau_c$), which is used to control a robot. In other embodiments, the outer loop control uses different inputs.

The MCI block represents an inverter for the robot's original control system (located to the right of the vertical line). The plant block R represents the plant, which consists of the devices attached to the motor's shaft (namely, the motor and the robot). The plant block R takes as input the torque $\tau$ and rotates the plant (motor and robot), therefore outputting the actual joint angular velocity ($\dot{q}$).

Using the computed-torque method as an example, suppose that $\bar{q}_d$ represents an n×1 vector of desired joint angles, and that we want to control a robot by commanding an n×1 vector of actuator torques $\tau_c$. Ignoring friction, the equation of motion of an unconstrained robot has the form:

$$M(q)\ddot{q}+B(q,\dot{q})+G(q)=\tau \qquad (11)$$

where M represents the n×n joint space inertia matrix, B represents the n×1 vector of centrifugal and Coriolis terms, G represents the n×1 vector of gravity terms, and $\tau$ represents the n×1 vector of joint torques.

A computed-torque control law ($\tau_c$) that decouples and linearizes the dynamics of the robot's motor and controller is given by:

$$\tau_c=M(q)\ddot{q}^*+B(q,\dot{q})+G(q) \qquad (12)$$

where $$\ddot{q}^*=\bar{\ddot{q}}_d+K_p(\bar{q}_d-q)+K_v(\bar{\dot{q}}_d-\dot{q}) \qquad (13)$$

$K_p$ represents a positive-definite diagonal position gain matrix, and $K_v$ represents a positive-definite diagonal velocity gain matrix.

4. Additional Embodiments

Although the invention has been described in considerable detail with reference to certain embodiments thereof, other embodiments are possible as will be understood to those skilled in the art.

APPENDIX

Motor and Controller Dynamics

The dynamics of a permanent magnet DC motor and a PID controller can be derived using a single-joint robot arm as an example. First, consider the motor dynamics. In a permanent magnet motor, a coil of wire (called an armature) is arranged in the magnetic field of a permanent magnet in such a way that the coil rotates when a current is passed through it. The actuator dynamics for the armature-controlled DC motor is described by the following equation:

$$L_a\frac{di_a}{dt}+R_ai_a=E-K_b\dot{q} \qquad (A1)$$

where $L_a$ represents the armature inductance, $i_a$ represents the armature current, $R_a$ represents the armature resistance, E represents the armature voltage, $K_b$ represents the armature back electromotive force (emf) constant, q represents the angular displacement of the motor shaft, and $\dot{q}$ represents the angular velocity of the motor shaft. In geared robots, the angular displacement of the load shaft is related to q by the gear ratio. For simplicity, we will assume that the gear ratio is unity.

The torque developed at the motor shaft is proportional to the armature current:

$$\tau=K_ti_a \qquad (A2)$$

where $K_t$ represents the motor-torque proportional constant. Substituting Eq. A2 into Eq. A1 and taking the Laplace transform, the torque developed by the motor is expressed by:

$$\tau(s)=K_tH_M(s)(E(s)-sK_bQ(s)) \qquad (A3)$$

where $H_M$ is defined by:

$$H_M(s) = \frac{1}{sL_a + R_a} \quad (A4)$$

The torque τ developed at the motor shaft is equal to the sum of the torques dissipated by the motor $\tau_m$ and the torque on the robot (referred to as the motor shaft) $\tau_L$.

Figure 8:
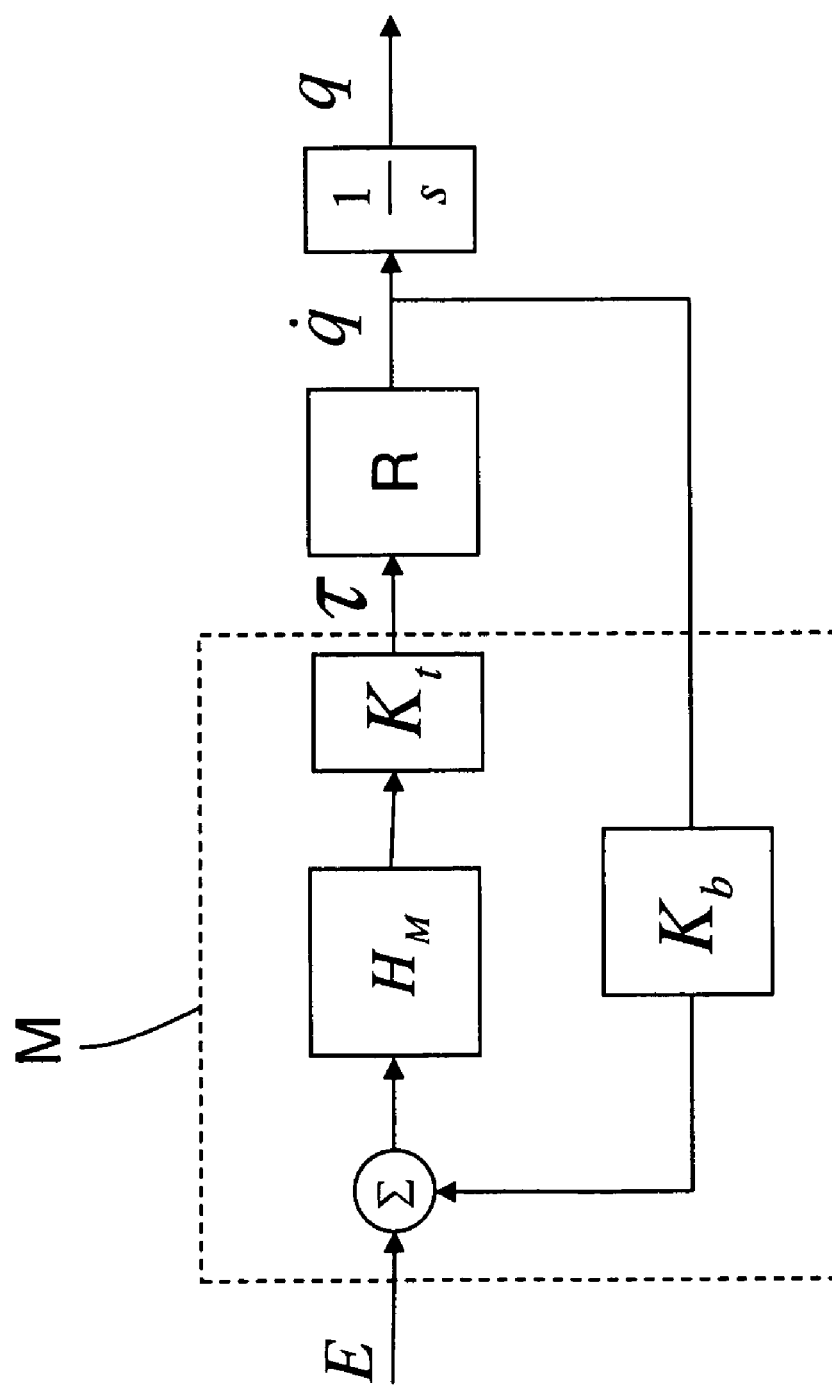
FIG. 8 illustrates a diagram of the typical open-loop input-output transfer characteristics of a motor and a robot, according to one embodiment of the invention.

FIG. 8 illustrates a diagram of the typical open-loop input-output transfer characteristics of a motor and a robot, according to one embodiment of the invention. FIG. 8 includes a motor block M, a plant block R, and a time integral block 1/s. The motor block M takes two inputs: a voltage (E) and an actual joint angular velocity (q̇). The motor block M outputs a torque τ, which is fed into the plant block R. The motor block M exhibits a transfer function of $H_M$. As explained above, $K_t$ and $K_b$ represent the motor-torque proportional constant and the armature back electromotive force (emf) constant, respectively. The Σ node represents a summing operation.

The plant block R represents a single-input, single-output (SISO) plant, which consists of the devices attached to the motor's shaft (namely, the motor and the robot). The plant block R takes as input the torque τ and rotates the plant (motor and robot), therefore outputting the actual joint angular velocity (q̇). In reality, robots often exhibit strong coupling effects between joints (i.e., the behavior of one joint is affected by the behavior of other joints). Coupling effects reduce the performance of independent-joint controllers.

Figure 9:
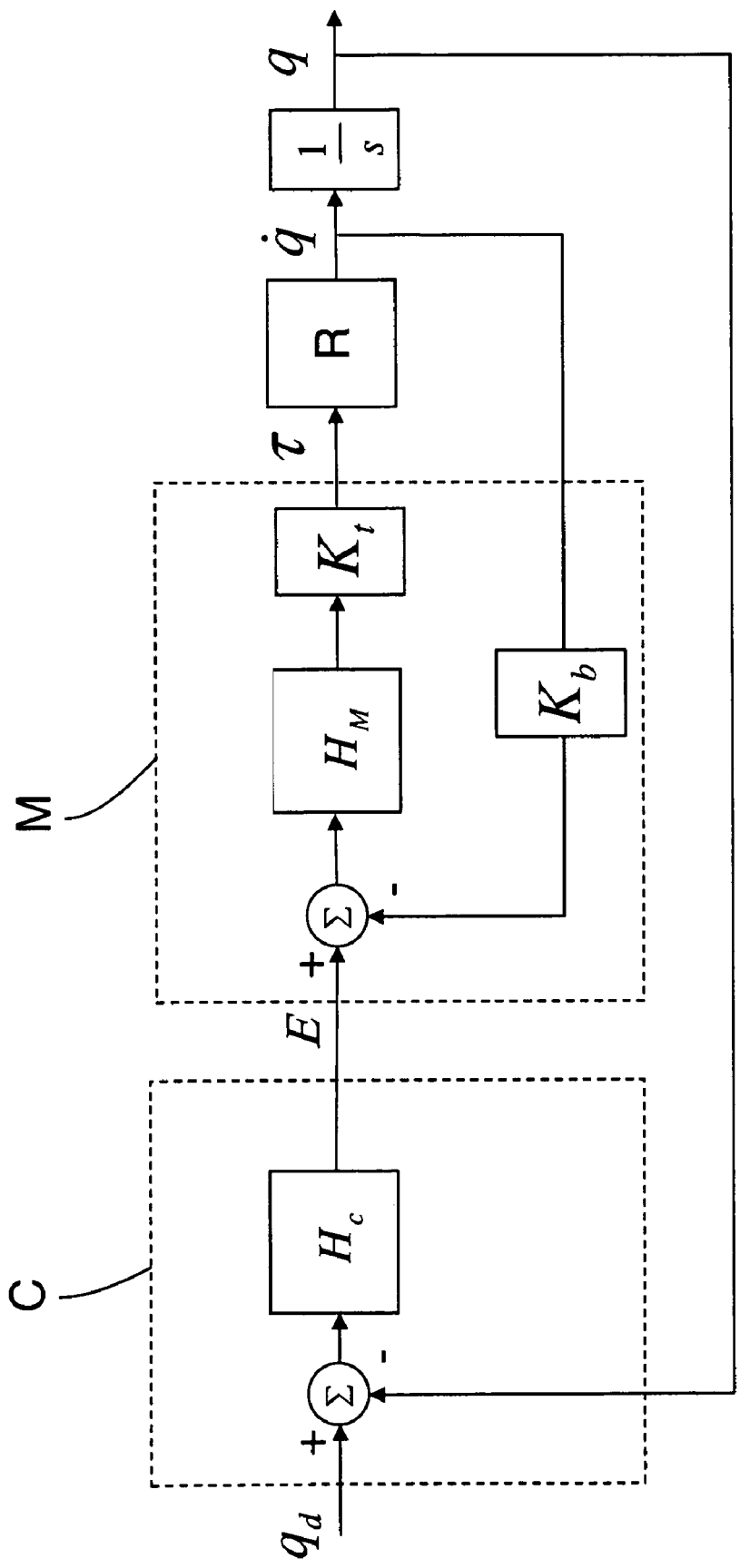
FIG. 9 illustrates a diagram of a typical closed-loop feedback structure used to control a robot, according to one embodiment of the invention.

The system in FIG. 8 is typically controlled with independent-joint position controllers. The objective of such controllers is to servo the motor (block M) such that the actual angular displacement of the joint (q) will track a desired angular displacement $(q_d)$. FIG. 9 illustrates a diagram of a typical closed-loop feedback structure used to control a robot, according to one embodiment of the invention. Note that FIG. 9 includes a controller block C followed by the system of FIG. 8.

The controller block C takes two inputs: a desired joint angle $(q_d)$ and an actual joint angle (q). The controller block C outputs a voltage (E), which is fed to the motor block M (specifically, to the motor's armature). The controller block C exhibits a transfer function of $H_c$. The Σ node represents a summing operation.

Suppose that a PID controller (block C) is used to servo the motor. Let q̃ represent the error between the desired shaft angle $q_d$ and the actual shaft angle q. The transfer function $H_c$ of a PID controller relating the voltage applied to the motor E and the position error q̃ is given by:

$$H_c(s) = \frac{E(s)}{\tilde{Q}(s)} = K_p + sK_v + \frac{K_I}{s} \quad (A5)$$

where $K_p$ represents the proportional feedback gain constant, $K_I$ represents the integral feedback gain constant, and $K_v$ represents the derivative feedback gain constant.

It follows from Eq. A5 that the applied voltage E is:

$$E(s) = H_c(s)(Q_d(s) - Q(s)). \quad (A6)$$

Eq. A6 describes the controller block C in the closed-loop position control of the system illustrated in FIG. 9.

The plant block R was assumed to be a single-input, single output system. In practice, this assumption is not true: the dynamics of one joint affects the dynamics of other joints, and vice versa. Coriolis and gravity effects on one joint vary with the configuration of the entire robot and cannot be correctly addressed by joint controllers acting independently. Hence the need for the new outer-loop controller presented above.

What is claimed is:

1. A system for cancelling an effect of a block C, comprising:
   a first node configured to output an error value based on a measured output voltage Ê of the block C;
   an error-correction block configured to output an error correction value based on the error value;
   a second node configured to output a value E̅ based on the error correction value;
   an inversion block $C^{-1}$ configured to output a value μ based on the value E̅,
   wherein the value μ is input into the block C.

2. The system of claim 1, wherein the error-correction block comprises:
   a first integrator configured to output a first integrated value based on the error value;
   a second integrator configured to output a second integrated value based on the first integrated value;
   a first amplifier configured to output a first amplified value based on the second integrated value;
   a first node configured to output a first node value based on the first integrated value and the first amplified value; and
   a second amplifier configured to output a second amplified value based on the first node. value.

3. The system of claim 2, wherein the first node of the error-correction block is further configured to add the first integrated value and the first amplified value.

4. The system of claim 2, wherein the first node of the error-correction block comprises a summing node.

5. The system of claim 2, wherein the error-correction block further comprises:
   a third integrator configured to output a third integrated value based on the second integrated value;
   a third amplifier configured to output a third amplified value based on the third integrated value; and
   a second node configured to output a second node value based on the second amplified value and the first amplified value,
   wherein the first node is further configured to output the first node value based on the first integrated value and the second node value.

6. The system of claim 5, wherein the first node of the error-correction block is further configured to add the first integrated value and the second node value.

7. The system of claim 5, wherein the first node of the error-correction block comprises a summing node.

8. The system of claim 1, wherein a transfer function of the error-correction block is equal to $$\frac{a_n \cdot s^n + a_{n-1} \cdot s^{n-1} + \ldots + a_2 \cdot s^2 + a_1 \cdot s + a_0}{s^{n+1}}.$$

9. The system of claim 1, wherein the block C comprises a controller.

10. The system of claim 1, wherein the block C comprises a joint controller for a robot.

11. The system of claim 1, wherein the block C comprises an independent-joint controller for a robot.

12. The system of claim 1, wherein the inversion block $C^{-1}$ is further configured to modify an input signal using a transfer function that is a multiplicative inverse of a transfer function of the block C.

13. The system of claim 1, wherein the first node of the system comprises a summing node.

14. The system of claim 1, wherein the first node of the system is further configured to subtract the measured output voltage $\hat{E}$ of the block C from a desired voltage $E_d$.

15. The system of claim 1, wherein the second node of the system comprises a summing node.

16. The system of claim 1, wherein the second node of the system is further configured to add the error-correction output to a desired voltage $E_d$.

17. A system for cancelling an effect of a block M, comprising:
  a first node configured to output an error value based on a measured output current $\hat{I}$ of the block M;
  an error-correction block configured to output an error correction value based on the error value;
  a second node configured to output a value $\bar{I}$ based on the error correction value;
  an inversion block $M^{-1}$ configured to output a value $\mu$ based on the value $\bar{I}$, wherein the value $\mu$ is input into the block M.

18. The system of claim 17, wherein the error-correction block comprises:
  a first integrator configured to output a first integrated value based on the error value;
  a second integrator configured to output a second integrated value based on the first integrated value;
  a first amplifier configured to output a first amplified value based on the second integrated value;
  a first node configured to output a first node value based on the first integrated value and the first amplified value; and
  a second amplifier configured to output a second amplified value based on the first node value.

19. The system of claim 17, wherein the block M comprises a motor, and wherein the measured output current $\hat{I}$ of the block M comprises a current of the motor's armature.

20. The system of claim 17, wherein the block M comprises a joint actuator for a robot.

* * * * *

UNITED STATES PATENT AND TRADEMARK OFFICE
CERTIFICATE OF CORRECTION

PATENT NO. : 7,355,364 B2  Page 1 of 1
APPLICATION NO. : 11/541001
DATED : April 8, 2008
INVENTOR(S) : Hector H. Gonzalez-Banos et al.

It is certified that error appears in the above-identified patent and that said Letters Patent is hereby corrected as shown below:

Column 12, line 33, please delete "node. value" and insert --node value--.

Signed and Sealed this

Fifteenth Day of July, 2008

JON W. DUDAS
*Director of the United States Patent and Trademark Office*